May 26, 1964 W. E. DU VALL 3,134,968

MAGNETIC-DECODER CIRCUIT

Filed Sept. 15, 1961 2 Sheets-Sheet 1

WILBUR E. DU VALL
INVENTOR.

BY Lyon & Lyon

ATTORNEYS.

WILBUR E. DU VALL
*INVENTOR.*

BY Lyon & Lyon

ATTORNEYS.

United States Patent Office 3,134,968

Patented May 26, 1964

3,134,968

MAGNETIC-DECODER CIRCUIT

Wilbur E. Du Vail, Gardena, Calif., assignor to The W. W. Henry Company, Huntington Park, Calif., a corporation of California Filed Sept. 15, 1961, Ser. No. 138,421

8 Claims. (Cl. 340—174)

This invention relates to binary-signal-decoding arrangements and, more particularly, to an improved magnetic decoding apparatus for binary-coded signals.

The decoding of binary-coded signals is usually accomplished by using a logic network comprising a plurality of gates which emit a recognition signal. Normally, some type of storage circuit is required for applying the binary-coded signals to the logic network, which includes either flip-flops, or a shift register, or some other form of storage network. Thus, the decoding function requires a plurality of components comprising tubes or transistors, which can deteriorate with time and use.

An object of this invention is the provision of a magnetic-decoding arrangement which is an improvement over those known heretofore.

Yet another object of the present invention is the provision of a magnetic-decoding arrangement wherein the functions of storage and decoding are effectuated by elements which do not deteriorate, either with time or use.

Still another object of the present invention is the provision of a novel, simple, useful, and inexpensive arrangement for decoding binary signals.

These and other objects of the invention may be achieved by providing a plurality of magnetic storage elements, two of these elements being made available for each binary bit in the binary code to be decoded. The storage elements are of a type which have two states of magnetic remanence. When a storage element is in one of its states of magnetic remanence, it represents the storage of a one binary bit; when in the other state of its magnetic remanence, it represents the storage of a zero binary bit. Provision is made for driving the magnetic elements in response to a binary code, so that one of the two magnetic elements assigned to a binary bit in the code is in a state of magnetic remanence representative of that binary bit while the other of the two magnetic elements assigned to that binary bit is in its opposite state of magnetic remanence, or in the state of magnetic remanence representing the complement of the binary bit.

For the purpose of simplification, assume that it is desired to decode a five-binary-bit word. Ten magnetic elements are provided—two for each binary bit. Provision is made for driving the ten magnetic elements in response to the word that they are to recognize, so that five of them are in their states of magnetic remanence representing that word and the other five are in the states of magnetic remanence wherein they represent the complements of that word. A sense winding is provided for each different binary word to be recognized. Each sense winding is coupled to all but one of the magnetic elements, which store a binary zero when the binary word, with which the sense winding is associated, is entered into the cores. Each sense winding is coupled with an opposite sense to the one of the magnetic elements storing a one when the binary word sought to be decoded is stored in the magnetic elements. In the embodiment of the invention to be described, the one of the elements storing a one to which the sensing winding is coupled is the element which stores the least-significant digit. However, this is for convenience, and not to be considered as a restriction.

In order to determine whether or not the word which has been stored in the magnetic elements is the one with which a sense winding is associated, a drive is applied to all of the magnetic cores, to drive them back to their binary-zero-representative states. The sensing winding associated with the word stored in the magnetic elements will have a positive output signal induced therein. All other windings will either have no output, or a negative output.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

For storing and decoding of binary words in accordance with this invention, magnetic elements having two states of magnetic remanence are required. These magnetic elements may be toroidal magnetic cores of the well-known type which have a rectangular magnetic hysteresis characteristic, or at least two states of magnetic remanence, and they may be made of either metal or ferrite material. One of the states of remanence to which the magnetic cores can be driven may be referred to as a "one" state and the other as a "zero" state. In accordance with the well-known practice in the computer art, a magnetic core can be driven in a manner to induce a voltage in a sense winding coupled thereon. The usual technique is to drive a core to one or the other of its two states of remanence, depending on whether a zero or one is desired to be stored. Then, when reading is desired, a drive is applied to the core to drive it to a predetermined one of its two states of remanence. The presence or absence of a pulse in the sensing winding then indicates what digit was stored in the core.

Figure 1:
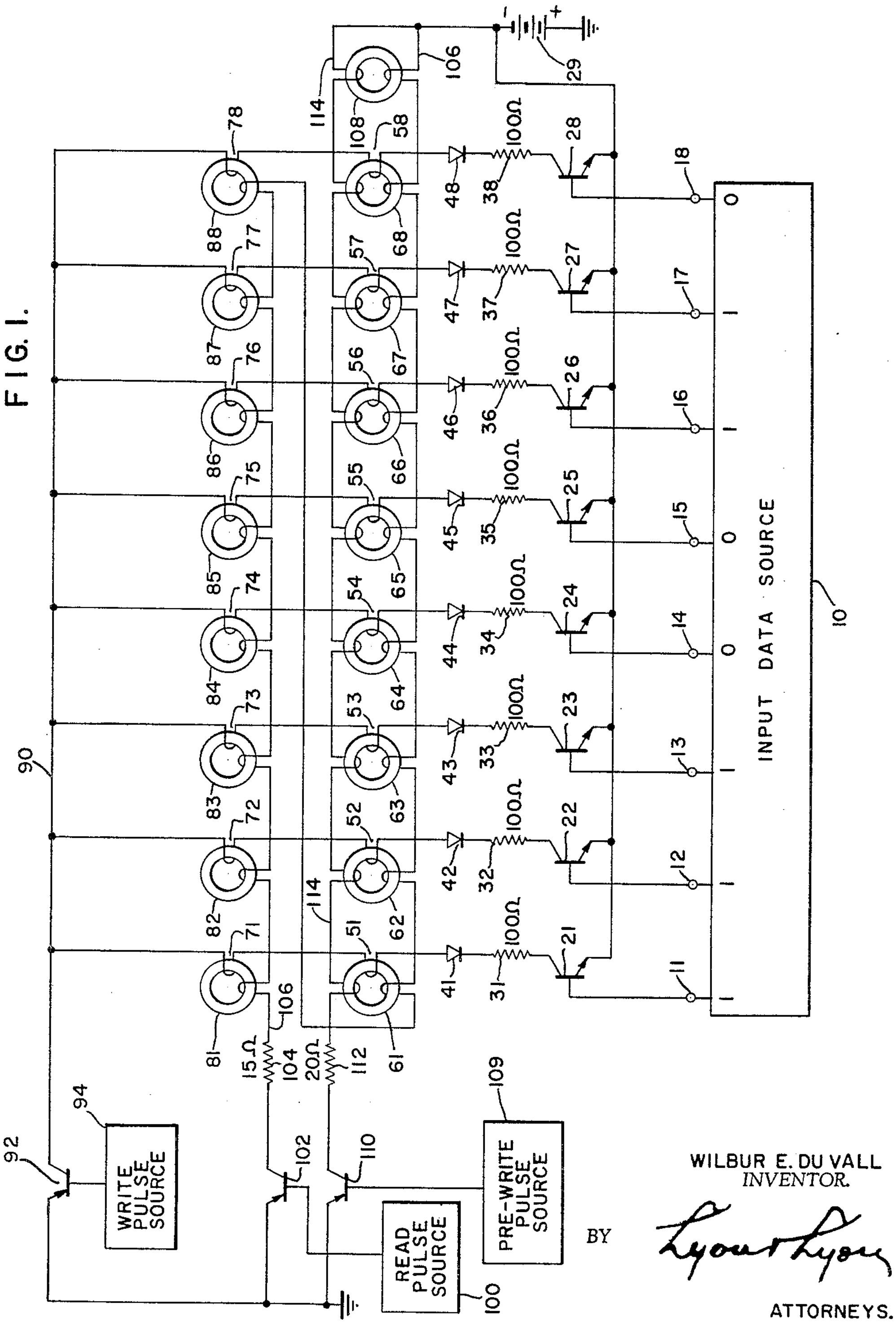
FIGURE 1 is a circuit diagram of an embodiment of the invention, omitting the sense windings, in order to simplify the drawing.
Figure 2:
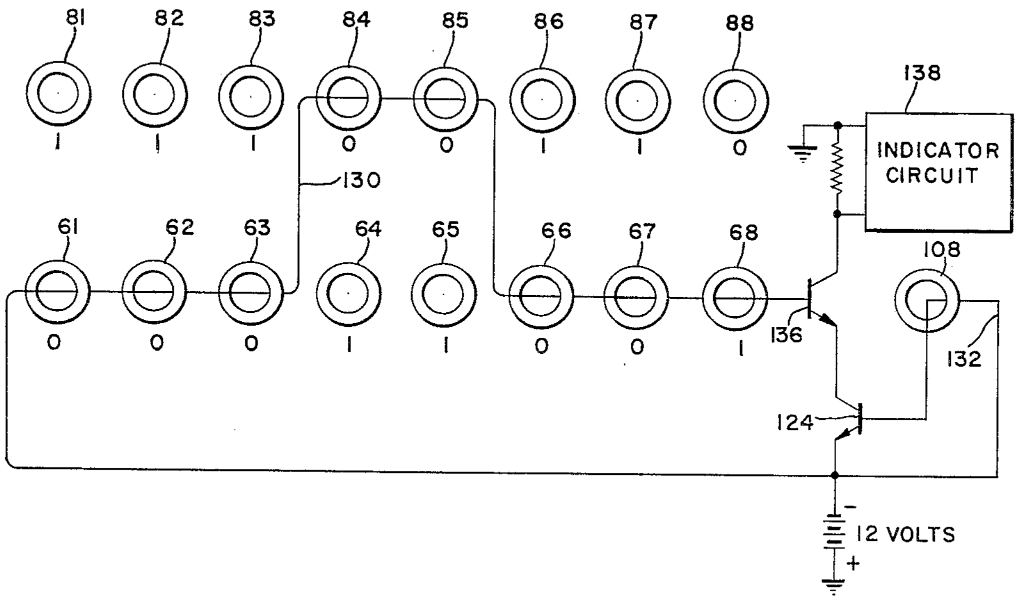
FIGURE 2 is a drawing, in accordance with this invention, of a plurality of magnetic-storage elements, including a sense winding, but omitting the associated circuitry for the purpose of simplification.
Figure 3:
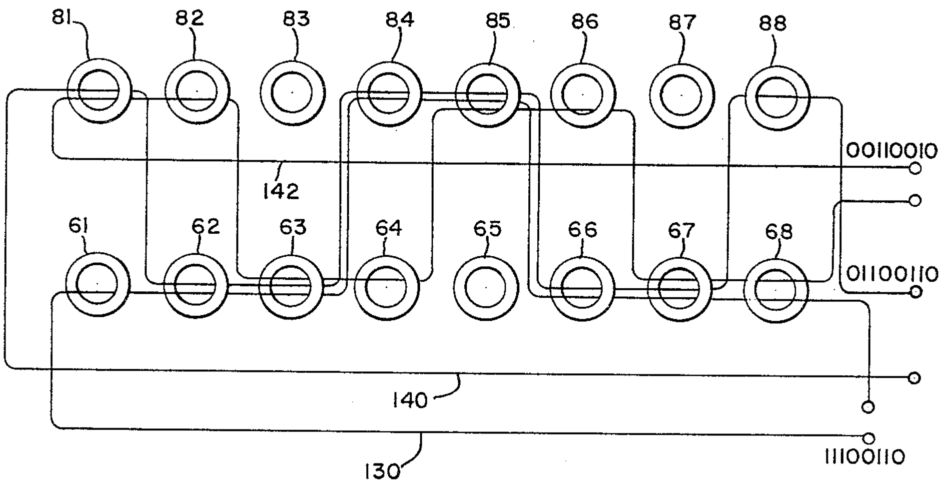
FIGURE 3 represents a sense-winding arrangement in accordance with this invention, but omitting the associated circuitry for the purpose of simplifying the drawing.

Referring now to FIGURE 1, there may be seen a circuit diagram of a decoding arrangement in accordance with this invention. For clarity, the sense windings are omitted from the cores shown in FIGURE 1. Sense windings are shown in FIGURES 2 and 3. Assume, now, that it is desired to decode binary words, each consisting of eight binary bits. A source of binary words is designated in the drawing as an input-data source 10. Its output constitutes eight electrical signals representative of the binary bits or digits of the binary word. At each one of the output terminals 11, 12, 13, 14, 15, 16, 17, and 18, a binary signal is provided of the type which, when the binary signal represents a one, a succeeding amplifier can be driven, and, when the binary signal represents a zero, the succeeding amplifier cannot be driven.

Each of the output terminals 11, 12, 13, 14, 15, 16, 17, and 18 is connected to a succeeding amplifier, which includes a transistor, respectively 21, 22, 23, 24, 25, 26, 27, and 28. The respective output terminals are connected to the respective bases of the respective transistors 21 through 28. The emitters of all the transistors are connected together and to a source of operating potential 29. The respective collectors of the transistors are respectively connected in series with respective resistors 31 through 38. The respective resistors are connected in series with respective diodes 41 through 48. The respective diodes are respectively connected in series with respective first drive windings 51 through 58, which are inductively coupled to the respective first cores 61 through 68. The respective first drive windings 51 through 58 are respectively connected in series to the respective second drive windings 71 through 78, which are inductively coupled to the second cores 81 through 88. The sense of the coupling of the first and second drive windings on the respective first and second cores is relatively opposite.

The second drive windings are all connected to a common bus 90, which is connected to a collector electrode of a switch transistor 92. The emitter of transistor 92 is connected to ground. The base of transistor 92 is connected to a write-pulse source 94. It will be noted that all the transistors 21 through 28 are connected in series, through the resistors 31 through 38, diodes 41 through 48, first windings 51 through 58, and second windings 71 through 78, bus 90, to the transistor 92. Therefore, unless this transistor is conductive, none of the other transistors can conduct current. Transistor 92 is normally nonconductive, but is rendered conductive by a signal from the write-pulse source. Thus, the time of writing into the cores is controlled by the write-pulse source.

Reading of the cores is effectuated by the application of a pulse from a read-pulse source 100 to the base of a transistor 102 to render it conductive. The transistor at this time is enabled to cause current flow through resistor 104 and a reading winding 106, which is inductively coupled to all the cores 81 through 88, 61 through 68, and a gate core 108. The reading winding is connected to the operating potential source 29, from which current is obtained. The sense of the coupling of the reading winding and the direction of current flow therethrough is such as to drive all the first and second cores and the gate core to their zero-representative states of magnetic remanence.

Prior to writing into or reading from the first and second cores, cores 61 through 68 and core 108 are driven to their "one" representative state of remanence by operation of a prewrite-pulse source 109, which applies a pulse to the base of a transistor 110 to render it conductive, whereby current is caused to flow through a resistor connected in series with a "prewrite" or "reset" winding 114. The winding is inductively coupled to all the cores 61 through 68 and to core 108 with a sense to drive these cores to their "one" states. This winding derives current from the operating-potential source 29.

By way of explanation of the operation of the system, assume that it is desired to enter a binary word into the magnetic cores for the purpose of being decoded. The first operation which occurs before any word entry is the energization of the prewrite-pulse source 109, which drives transistor 110 momentarily conductive in saturation, but over a sufficiently long interval to insure that each one of the cores 61 through 68 and core 108 are driven to their binary-one-representative states by the winding 114.

The next operation which occurs is the alteration of the states of remanence of all the magnetic cores in accordance with the binary word which is to be entered therein. Assume that signals representative of a binary word 11100110 are applied to terminals 11 through 18 by the input data source. Transistors 21, 22, 23, 26, and 27 will not become conductive, however, until switch transistor 92 is rendered conductive. The reason for this is that the collectors of all the transistors 21 through 28, by virtue of the common bus 90, are connected in series with transistor 92, which acts as a switch to prevent change in the states of remanence of the cores, until it is operated. The write pulse source 94 applies a pulse to the base of transistor 92 to enable it to conduct in saturation. This, in turn, enables those of the transistors, to which a binary-one signal is being applied from the data source, to become conductive in saturation. The windings, respectively 51 through 58 and 71 through 78, are wound in the opposite sense to one another on their associated cores. As a result, for example, winding 51 will drive the core 61 to its zero-representative state, whereas winding 71 will drive the core 81 to its one-representative state. Similarly, winding 52 will drive core 62 to its zero-representative state, whereas winding 72 will drive core 82 to its one-representative state. Winding 53 will drive core 63 to its zero-representative state, and winding 73 will drive core 83 to its one-representative state. Winding 56 will drive core 66 to its zero-representative state, and winding 76 will drive core 86 to its one-representative state. Winding 57 will drive core 67 to its zero-representative state, and winding 77 will drive core 87 to its one-representative state. The states of remanence of the first and second cores is such that they now store the binary word and its complement.

Referring now to FIGURE 2, there may be seen a representation of the cores, respectively 61 through 68 and 108, and 81 through 88, and, wound thereon, is the sensing or decoding winding 130, which performs the decoding operation. The logic for decoding is to inductively couple decoding winding 130 in sequence to each one of the cores, which, upon entry into the cores of a predetermined binary word to be decoded, will be storing a binary zero and to the last core which stores a one. That is, the sensing winding 130 is coupled to all of the zero storing cores except that instead of coupling to the last zero representative core 88, instead it is coupled to the last one of the cores 68, which, for the predetermined binary word which is being stored, represents a one. The sense of the winding 130 is the same on all of the zero-representative cores, but, on the one-representative core 68, it is opposite relative to the sense of the winding on the zero-representative cores.

When it is desired to decode, or read out, the read-pulse source 100 is actuated, whereby transistor 102 is rendered conductive and current can flow through winding 106. This drives all the cores not in their zero state of remanence to their zero state of remanence. In response to this drive, if the cores had been storing the predetermined code word, the only voltage which is induced in the winding 130 is that due to the drive on the magnetic core 68 when it is driven to the zero-representative state. This voltage may be considered as a positive-going voltage.

It will be noted that the magnetic core 108, which is designated as a gating core, is also coupled to the winding 106. This core is also driven from its one to its zero state, at which time it induces a voltage in an output winding 132, which is inductively coupled thereon. This output winding is coupled between the base and the emitter of a transistor 124. The winding 130 is connected to the base of a transistor 136. The emitter of this transistor is connected to the collector of the transistor 124. The collecor of transistor 136 is connected through a resistor to ground. An output may be taken from the collector of transistor 136. This output is applied to an indicator circuit 138.

From the foregoing description, it should be clear that the magnetic core 108, when driven from its one- to its zero-representative state, renders transistor 124 conductive. Transistor 136 can thus also become conductive if a signal of proper polarity is applied to its base. Since the transistor 136 is of the NPN type, its base must be driven positive with respect to its emitter, which occurs only when the pulse applied thereto is derived from a single core being driven from its one to its zero state, which also has the winding 130 coupled thereon with the proper sense. In other words, were some binary word stored in the magnetic cores 81 through 88 and 61 through 68 which is different from the binary word for which the winding 130 is wound to decode, then the voltages which would be induced in the winding 130 in response to the reading drive would be such as to produce either a zero or a negative voltage at the base of the transistor 136.

To further illustrate this, assume that core 66 is in its one state instead of its zero state prior to the reading drive and all the other cores are in the same states, as was indicated previously. Upon the occurrence of the reading drive, the output from core 66 and the output from core 68 would be of opposite polarity and would substantially cancel. Should any of the other cores through which the winding 130 is threaded be one instead of zero, then the voltage which would be applied to the base of transistor 136 would be negative and would have an amplitude determined by the number of magnetic cores which are one instead of zero.

In the foregoing description, it was indicated that the input-data source 10 presented the binary bits at the terminals 11 through 18 in parallel and that these were not entered into the magnetic cores until the write-pulse source 94 was actuated, whereby switch transistor 92 became conductive. It should be noted that a parallel entry of the binary bits into the magnetic cores is not the only mode of operation in this invention. The input data source can apply the data bits in sequence, or in any random fashion, to the terminals 11 through 18. Provision may be made to actuate the write-pulse source 94 each time it is desired to enter a data bit, and, when total number of data bits required have been entered, then the readout and decode operation can be made to occur.

The description of the invention thus far has indicated only one sense winding for decoding a single word. Actually, as many sense windings as there are words desired to be decoded may be employed. By way of example, in an embodiment of the invention which was built and successfully operated, 256 binary words were decoded, using 256 words wound on the cores.

FIGURE 3 illustrates three sense windings, respectively 130, 140, 142, wound on the cores for detecting three separate words. The winding 130, as before, detects the word 11100110. The winding 140 detects the binary word 01100111. The winding 142 detects the word 00110010.

The winding 140 is inductively coupled to cores 81, 62, 63, 84, 85, 66, 67, and 88. All the cores represent the zero binary state when the code word to be recognized is entered into the plurality of cores, except the core 88. This core will be in its one-representative binary state. The winding 140 is on all the zero-storing cores in one winding sense and on the one-storing core 88 in the opposite winding sense.

Winding 142 is coupled to cores 81, 82, 63, 64, 85, 86, 67, and 68. When all the cores are driven to their zero state after a word has been entered therein, then only the winding which is associated with the stored word will have a positive-output voltage induced therein. All other windings will have either no voltage or negative-going voltage induced therein. It will be understood, of course, that a separate circuit of the type including transistor 136 and the indicating circuit 138 is required.

Gating core 108 and transistor 124 may be employed for gating on whichever of the indicating circuits is connected to a sense winding in which a positive-going voltage signal is induced, signifying identification of a binary word.

There has accordingly been described and shown herein a novel, useful, and simple arrangement for decoding binary words. Although the description of the invention indicates that the decoding windings are threaded through those of the magnetic cores which are in their binary-zero-representative state, except for the last cores, which are in their binary-one-representative states, it will be easily recognized that the opposite arrangement can be employed to thread the code-identifying windings through all of the cores which, when the proper code has been entered, are in their one-representative states, except for the last core, which is in its zero-representative state. Further, the type of transistors which have been illustrated in the drawings should not be considered as a limitation upon the invention, since those skilled in the art will readily be able to use other types of transistors or devices, without departing from the spirit and scope of this invention.

I claim:

1. A system for decoding a binary word consisting of a plurality of binary bits, said system comprising a pair of magnetic cores for each binary bit in a code word to be identified, each of said magnetic cores having a first and second state of magnetic remanence, a different writing winding for each of said pair of magnetic cores, each said writing winding being inductively coupled to one of a pair of cores with one sense and to the other of a pair of cores in the opposite sense, a sensing winding inductively coupled to one core in all but one of the pairs of cores, said one core being the one which, when the code word desired to be recognized is stored in said cores, is in its first state of magnetic remanence, said sensing winding being coupled to one core in the remaining pair of cores which will be in its second state of magnetic remanence when said desired code word is stored in said cores, the sense of the coupling of said sensing winding on said one core being opposite relative to the sense of the coupling of the sensing winding on the remaining cores, means for applying signals to each said writing winding representative of the binary bits of a code word to be identified to drive one core in each of said pairs of cores to a first state representative of the binary bit being applied to the writing winding, and the remaining ones of the cores in each of said pairs of cores to the complementary states of magnetic remanence, and means to drive all said cores to their first state of magnetic remanence whereby if the code word stored in said magnetic cores is the predetermined desired code word a voltage indicative thereof is induced in said reading winding.

2. Apparatus for identifying predetermined binary words each having the same number of binary digits comprising a different pair of magnetic cores for each binary-digit position, each of said magnetic cores having a first and second state of magnetic remanence and being drivable therebetween, a magnetic core representting the storage of one type of binary digit when in its first state of magnetic remanence and the storage of the other type of binary digit when in its second state of magnetic remanence, means for driving one of the cores in all of said pairs of magnetic cores to states of remanence representative of the binary digits of a binary word and for driving the other of all of the cores of said pairs of magnetic cores to states of remanence representative of the complement of said binary word, a different sensing winding associated with each predetermined binary word to be identified, each said sensing winding being inductively coupled with one sense to the cores in all but one pair of cores which is in its first state of magnetic remanence and in an opposite sense to the core in the remaining pair which is in its second state of magnetic remanence when the predetermined word with which a sensing winding is associated is stored in said magnetic cores, means to drive all of said magnetic cores to their first state of magnetic remanence, and means responsive to the voltage induced in one of said sensing windings being substantially that derived from the drive applied to said core in the remaining pair of cores to identify the one of said predetermined binary words which has been stored in said magnetic cores.

3. Apparatus as recited in claim 2 wherein said means for driving one of the cores in all of said pairs of magnetic cores to states of remanence representative of the binary digits of a binary word and for driving the other of all of the cores of said pairs of magnetic cores to states of remanence representative of the complement of said binary word includes a different drive winding for each pair of cores, each drive winding being inductively coupled to one core of a pair with a sense to drive it when excited to its first state of magnetic remanence and to the other core of a pair with a sense to drive it when excited to its other state of magnetic remanence, a normally open switch means connected to one end of all of said drive windings, means for applying current representative of a different binary digit to each one of the other ends of said drive windings, and means for closing said normally open switch means to permit the applied currents to flow through said drive windings when it is desired to store a binary word in said cores.

4. Apparatus for identifying a predetermined binary word consisting of a plurality of binary bits comprising a different pair of magnetic cores for each binary bit, each of said magnetic cores having a first and second state of magnetic remanence and being driveable therebetween, a magnetic core representing the storage of one type of binary digit when in its first state of magnetic remanence and the storage of the other type of binary bit when in its second state of magnetic remanence, means for driving one of the cores in each pair of cores to its second state of magnetic remanence, means for applying drives to all of said pairs of cores responsive to the digits of a binary word to cause said others of the cores of said pairs of cores to represent said binary word and said ones of the cores in said pairs of cores to represent the complement of said binary word, a sensing winding inductively coupled with one sense to one core in all but one of said pairs of cores which are in their first state of magnetic remanence and to a core in said one of said pairs of cores in an opposite winding sense which core is in its second state of magnetic remanence when said predetermined binary word is being represented by said cores, means to drive all said magnetic cores to their first state of magnetic remanence, and means responsive to the largest voltage induced in said sensing winding being that from said core in the remaining pair to indicate that said predetermined binary word has been stored in said magnetic cores.

5. Apparatus as recited in claim 4 wherein said means responsive to the largest voltage induced in said readout winding being that from said core in the remaining pair to indicate that said predetermined binary word has been stored in said magnetic cores includes a gating core, means for driving said gating core to its second state of magnetic remanence responsive to said means for driving one of the cores in each pair of cores to its second state of magnetic remanence, means for driving said gating core to its first state of magnetic remanence responsive to said means to drive all said magnetic cores to their first state of magnetic remanence, means for driving an output from said gating core when it is driven from the second to its first state of magnetic remanence, and means for maintaining said means to indicate inoperative except in the presence of said output.

6. Apparatus for separately identifying a plurality of predetermined binary words each having the same number of binary digits comprising a first and second group of magnetic cores each group containing as many magnetic cores as there are binary digits in the words to be recognized, all of said cores having two states of magnetic remanence and being driveable therebetween, a core when in one of its two states of magnetic remanence representing a storage of binary zero and when in the other of its two states of magnetic remanence representing storage of a binary one, means for driving the cores of said first group to represent the binary digits of a word and for driving the cores of said second group to represent the complement of the binary digits stored in said first group, a separate sensing winding associated with each predetermined binary word, each sensing winding being inductively coupled with one sense to all but one of the cores in said first and second groups which when the predetermined word with which it is associated is stored therein are in one of their two states of magnetic remanence, said sensing winding being inductively coupled with an opposite sense to the core storing the complement of the binary bit stored in said one of the cores, means for driving all of said cores to one of their two states of magnetic remanence, and a separate indicator means connected to each sensing winding responsive to the largest voltage induced in one of said sensing windings being that from said core in the remaining pair to indicate that the predetermined binary word with which that sensing winding is associated has been stored in said magnetic cores.

7. Apparatus for identifying predetermined binary words as recited in claim 6 wherein said means for driving the cores of said first group to represent the binary digit of a word and for driving the cores of said second group to represent the complement of the binary digits of a word includes means for preliminarily driving all said cores in said second group to their second state of magnetic remanence, and a plurality of driving windings, each driving winding being inductively coupled to a different core in said first group with one sense and to a different core in the second group with an opposite sense, a normally open switch, means for connecting one end of all of said driving windings to said normally open switch, means for applying signals representative of the binary digits of a word to the other ends of said plurality of cores, and means for closing said normally open switch each time it is desired to enable storage of the binary digits represented by said signals in said groups of magnetic cores.

8. Apparatus as recited in claim 6 wherein said means responsive to the largest voltage induced in said readout winding being that from said core in the remaining pair to indicate that said predetermined binary word has been stored in said magnetic cores includes a gating core, means for driving said gating core to its second state of magnetic remanence responsive to said means for driving one of the cores in each pair of cores to its second state of magnetic remanence, means for driving said gating core to its first state of magnetic remanence responsive to said means to drive all said magnetic cores to their first state of magnetic remanence, means for driving an output from said gating core when it is driven from the second to its first state of magnetic remanence, and means for maintaining said means to indicate inoperative except in the presence of said output.

No references cited.